United States Patent [19]

Ping

[11] 4,109,744

[45] Aug. 29, 1978

[54] FLEXIBLE ENGINE COWLING FOR CONSTRUCTION VEHICLES

[75] Inventor: David T. Ping, Decatur, Ill.

[73] Assignee: Caterpillar Tractor Co., Peoria, Ill.

[21] Appl. No.: 812,092

[22] Filed: Jul. 1, 1977

[51] Int. Cl.² ............................................. B60K 11/04
[52] U.S. Cl. ............................... 180/68 P; 296/28 C
[58] Field of Search ................. 180/68 P, 68 R, 69 R, 180/54 A, 89.12, 89.14, 89.17, 89.19; 280/756, 759; 296/28 C

[56] References Cited

U.S. PATENT DOCUMENTS

| | | | |
|---|---|---|---|
| 1,113,790 | 10/1914 | Lasko et al. | 180/69 R |
| 1,200,809 | 10/1916 | Church | 180/69 R |
| 2,184,882 | 12/1939 | Meyer | 180/68 P |
| 2,965,187 | 12/1960 | Zeman | 180/69 R |
| 3,055,699 | 9/1962 | May | 296/28 C |
| 3,334,704 | 8/1967 | Gehrke et al. | 180/68 R |
| 3,977,489 | 8/1976 | Cole et al. | 180/89 R |

FOREIGN PATENT DOCUMENTS 2,504,700  8/1976  Fed. Rep. of Germany ........ 180/69 R

OTHER PUBLICATIONS

"Cat 777 Truck", Caterpillar Tractor Co.

Primary Examiner—David M. Mitchell
Attorney, Agent, or Firm—Phillips, Moore, Weissenberger, Lempio & Majestic

[57] ABSTRACT

A construction vehicle, such as a truck, comprises a main frame having an engine and a radiator mounted thereon. An inverted U-shaped cowl assembly is secured to the frame, adjacent to the radiator. A perforated guard assembly is secured on the cowl assembly to cover the radiator to protect the same.

8 Claims, 5 Drawing Figures

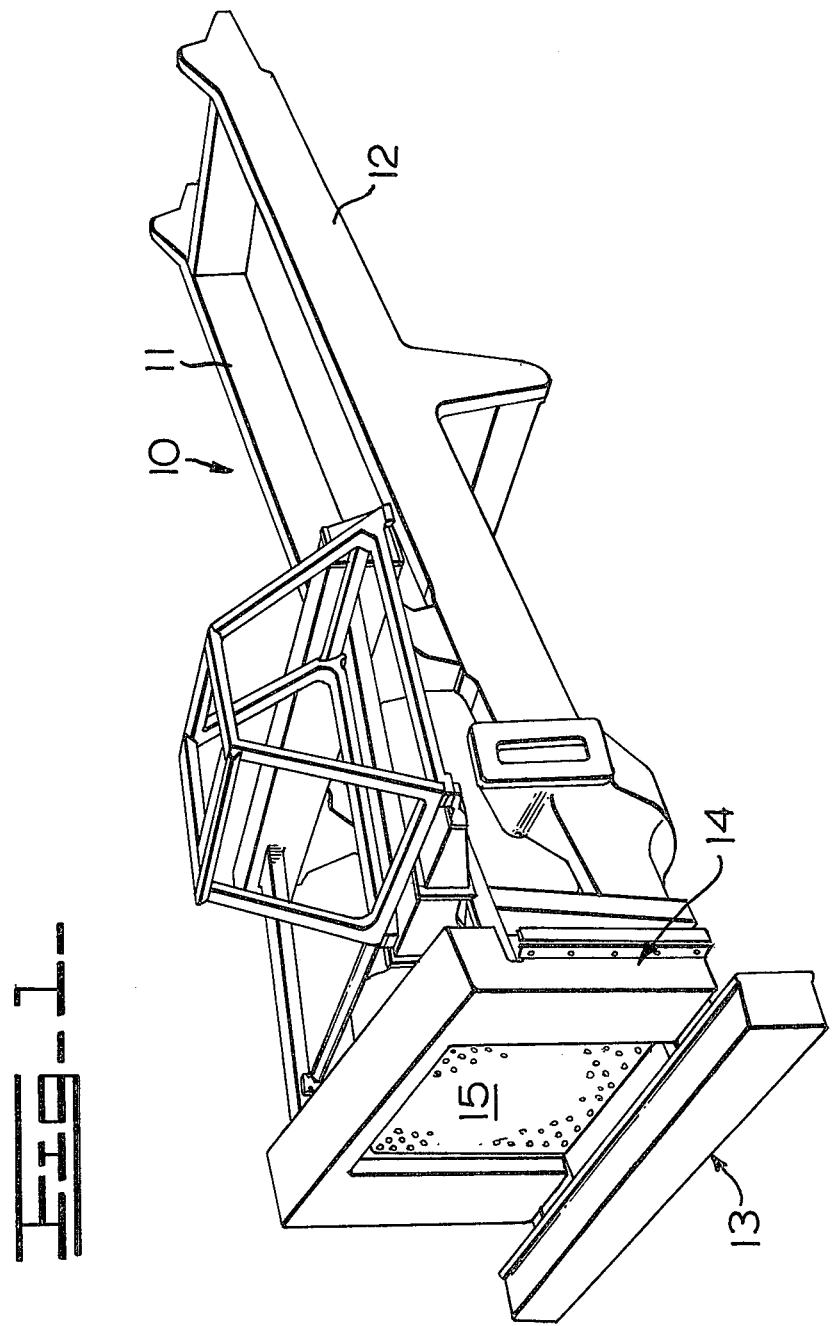

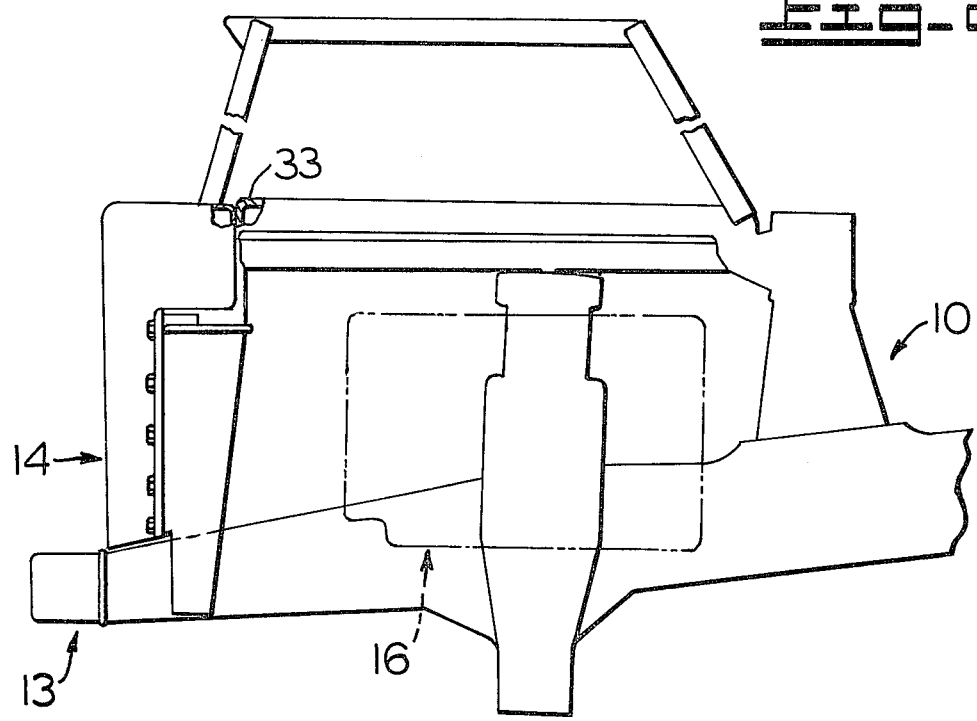
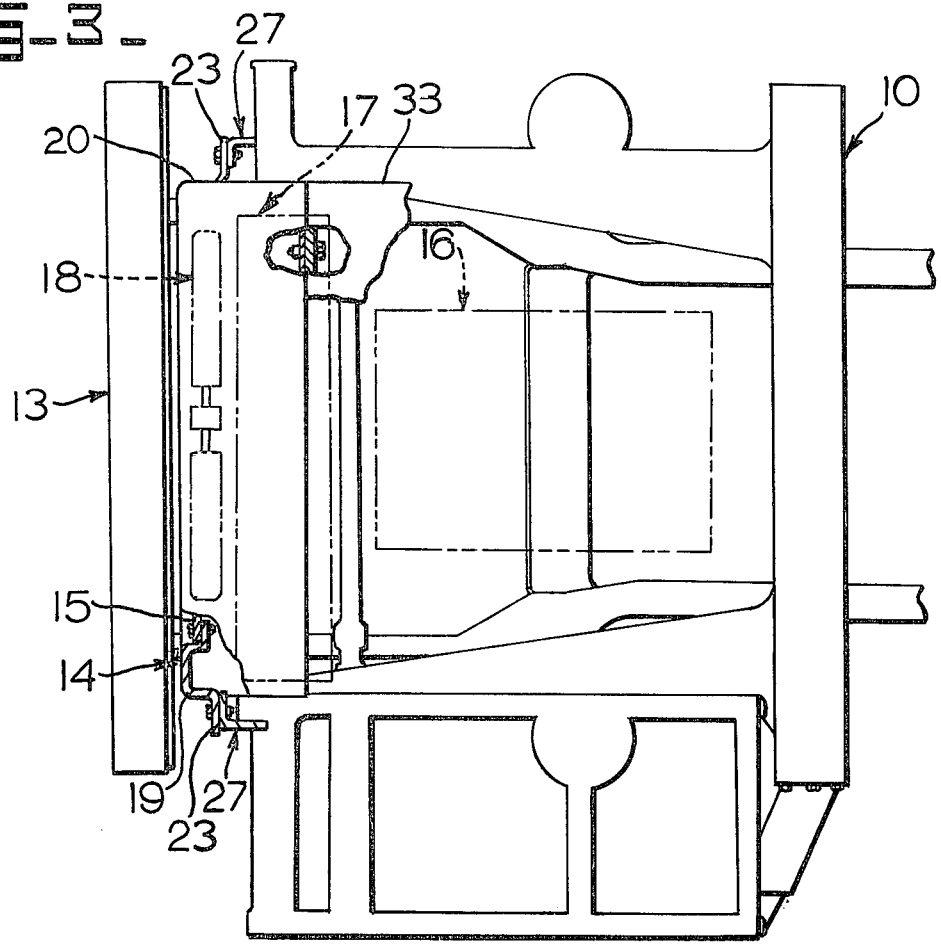

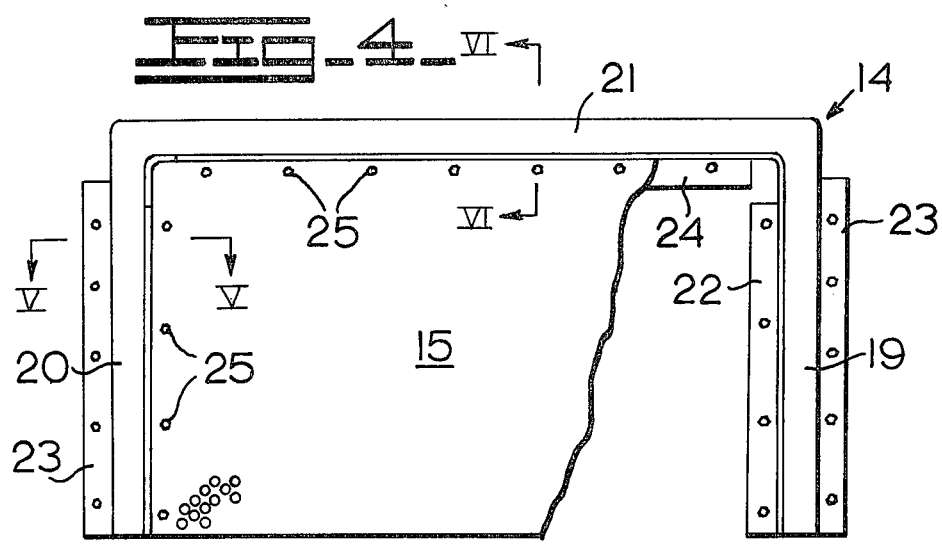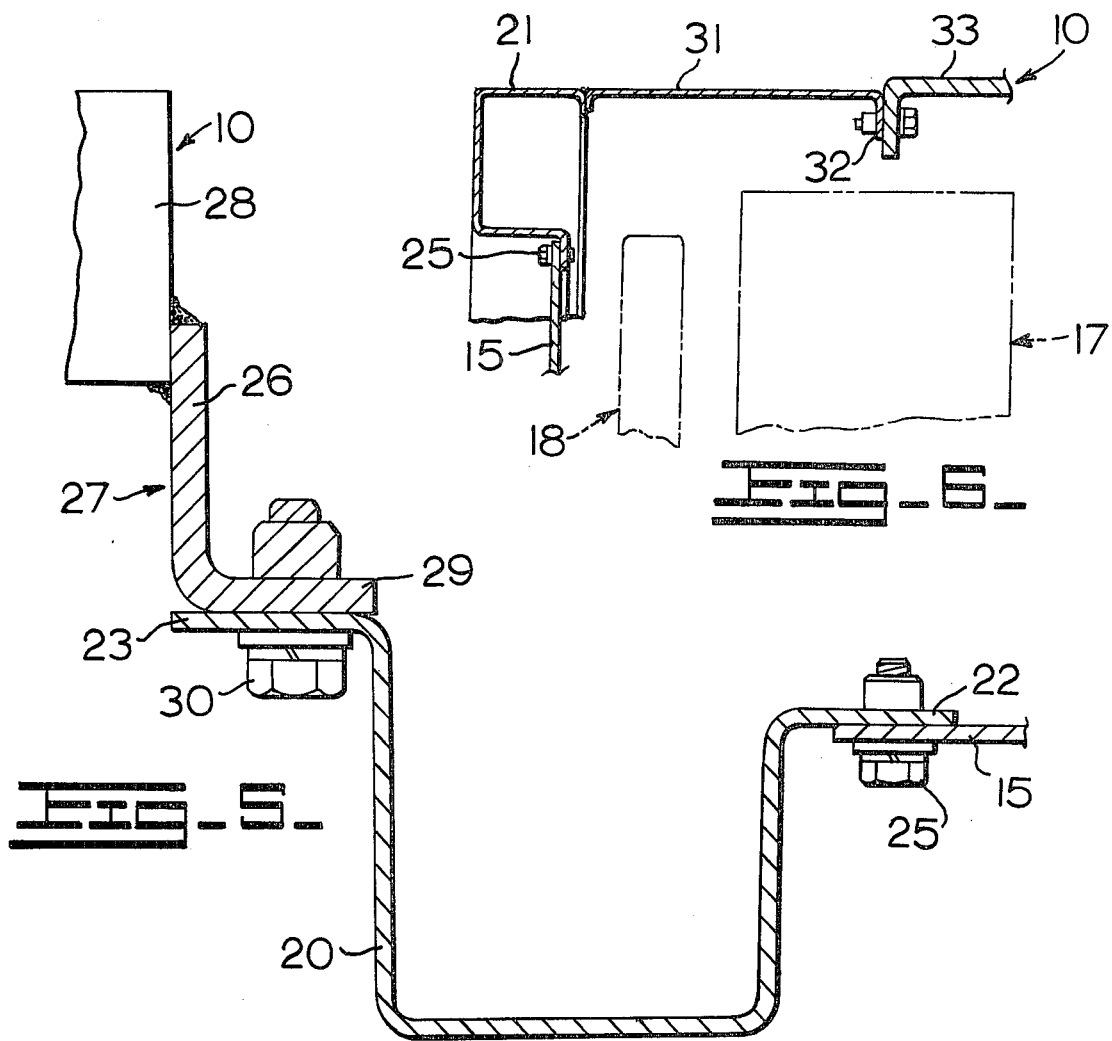

FLEXIBLE ENGINE COWLING FOR CONSTRUCTION VEHICLES

BACKGROUND OF THE INVENTION

This invention relates to a cowl assembly for construction vehicles, such as trucks, having a guard assembly secured thereon to protect an air-cooled radiator.

A conventional cowl assembly for a truck comprises a rectangular frame construction secured about its entire periphery to the main frame of the truck. The cowl assembly is thus substantially rigid and inflexible which subjects it to potential damage when forces are transmitted therethrough in response to operation of the truck over uneven terrain and the like.

SUMMARY OF THIS INVENTION

The present invention is directed to overcoming one or more of the problems as set forth above.

The improved cowl assembly of this invention is U-shaped to comprise a pair of laterally spaced and vertically disposed side members and a horizontally disposed upper member secured between upper ends of the side members. Such members are suitably secured to the frame and a perforated guard assembly is secured on the cowl assembly and is disposed in covering relationship relative to a radiator mounted on the frame and disposed therebehind.

BRIEF DESCRIPTION OF THE DRAWINGS

Other objects of this invention will become apparent from the following description and accompanying drawings wherein:

FIG. 1 is a perspective view of an integrated frame for a construction vehicle having the cowl assembly of this invention mounted forwardly thereon;

FIG. 2 is a side elevational view of a forward portion of the frame and the cowl assembly;

FIG. 3 is a top plan view of the forward portion of the frame and the cowl assembly;

FIG. 4 is a front elevational view of the cowl assembly having a perforated guard assembly secured thereon; and FIGS. 5 and 6 are enlarged sectional views, taken in the direction of arrows V—V and VI—VI in FIG. 4, respectively, illustrating means for securing the cowl assembly to the frame of the vehicle.

DETAILED DESCRIPTION

FIG. 1 illustrates an integrated frame 10 of a construction vehicle, such as a truck, comprising a pair of laterally spaced and longitudinally extending side rails 11 and 12 having a bumper assembly 13 secured forwardly thereon. A cowl assembly 14, embodying this invention is also secured forwardly on the frame and has a perforated guard assembly 15 secured thereon. As shown in FIGS. 2 and 3, an internal combustion engine 16 is mounted on the frame and is adapted to be cooled in a conventional manner by a standard air-cooled radiator 17 and an engine-driven fan 18, both mounted behind and closely adjacent to cowl assembly 14.

Referring to FIGS. 2-4, cowl assembly 14 has an inverted U-shape to include a pair of laterally spaced and vertically disposed side members 19 and 20 and a horizontally disposed upper member 21 secured between upper ends of the side members. Inner and outer flanges 22 and 23 are integrally secured to each side member whereas an inner flange 24 is secured to upper member 21. Guard assembly 15, constituting a flat perforated plate, is secured to inner flanges 22 and 24 by a plurality of bolts 25.

Referring to FIG. 5, one leg 26 of an elongated angle 27, extending in co-extensive relationship relative to each outer flange 23, is welded or otherwise suitably secured to a member 28 of frame 10. A second leg 29 of the angle abuts outer flange 23 and is secured thereto by a plurality of bolts 30. As shown, side member 20, for example, has a U-shaped cross section whereby inner flange 22 disposes guard assembly 15 in recessed relationship within the cowl assembly.

Referring to FIG. 6, upper member 21 has a box-like or rectangular cross section. An upper cover plate 31 is secured to the upper member to form an integral part thereof and extends rearwardly into the engine compartment to terminate at a mounting flange 32. The flange is coextensive with an elongated cross member 33, formed as an integral part of frame 10.

In view of the above description, it can be seen that forces imposed upon frame 10 (FIG.1) are transmitted between side rails 11 and 12 via structurally integrated bumper assembly 13 and other cross members of the integrated frame construction. Cowl assembly 14, having its lower end maintained in unsecured relationship relative to frame 10 and bumper assembly 13, is free to slightly flex to absorb forces imparted thereto upon travelling of the vehicle over uneven terrain, for example. The cowl assembly will thus exhibit an increased life expectancy over a conventional cowl assembly which is constructed to have a rectangular cross section and which would have its lower end secured directly to bumper assembly 13, for example.

The embodiments of the invention in which an exclusive property or privilege is claimed are defined as follows:

1. A vehicle comprising
   a frame comprising a pair of laterally spaced and longitudinally extending frame members, a pair of laterally spaced and vertically extending side frame members and an upper horizontal cross frame member,
   a radiator mounted on said frame,
   an inverted U-shaped cowl assembly mounted adjacent to said radiator, including only a pair of laterally spaced and vertically disposed side members and a horizontally disposed upper member secured between upper ends of said side members,
   means securing each of the side members to a respective one of the side frame members and the upper member of said cowl assembly to the upper cross frame member of said frame directly whereby the lower end of said cowl assembly remains in unsecured relationship with respect to said longitudinally extending frame members, and
   a perforated guard assembly secured on said cowl assembly and disposed in covering relationship on a frontal side of said radiator.

2. The vehicle of claim 1 wherein said means securing the side and upper members of said cowl assembly to said frame member comprises a flange formed integrally with each of said side and upper members.

3. The vehicle of claim 2 wherein said means securing the side and upper members of said cowl assembly to said frame member further comprises a plurality of bolts releasably securing each said flange to said frame.

4. The vehicle of claim 3 wherein said cross frame member comprises an angle disposed in coextensive relationship relative to the flange formed integrally on each of said side members and wherein some of said bolts releasably secure such flange to said angle.

5. The vehicle of claim 3 wherein said upper member comprises a plate member extending rearwardly towards said cross frame member therefrom and having one of said flanges formed integrally thereon.

6. The vehicle of claim 1 further comprising an inner flange formed on each of said side and upper members and wherein said perforated guard assembly comprises a flat perforated plate secured to said inner flanges.

7. The vehicle of claim 6 wherein each of said inner flanges is recessed rearwardly within said cowl assembly and wherein said guard assembly is secured to said inner flanges by a plurality of bolts.

8. The vehicle of claim 1 further comprising a bumper assembly secured on said longitudinally extending frame members, adjacent to and forwardly of said cowl assembly.

* * * * *